(12) United States Patent
Hahin et al.

(10) Patent No.: US 7,720,387 B2
(45) Date of Patent: May 18, 2010

(54) MICROCODE-DRIVEN CALCULATION OF TEMPERATURE-DEPENDENT OPERATIONAL PARAMETERS IN AN OPTICAL TRANSMITTER/RECEIVER

(75) Inventors: Jayne C. Hahin, Cupertino, CA (US); Luke M. Ekkizogloy, San Jose, CA (US); Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 616 days.

(21) Appl. No.: 10/883,208

(22) Filed: Jun. 30, 2004

(65) Prior Publication Data

US 2006/0002708 A1    Jan. 5, 2006

(51) Int. Cl.
*H04B 10/00* (2006.01)
(52) U.S. Cl. .................. 398/136; 398/138; 398/192
(58) Field of Classification Search .......... 398/182–201, 398/135–139, 192–198
See application file for complete search history.

(56) References Cited

U.S. PATENT DOCUMENTS

| | | | |
|---|---|---|---|
| 4,784,454 A | 11/1988 | Dyott | |
| 5,019,769 A * | 5/1991 | Levinson | 372/31 |
| 5,035,481 A | 7/1991 | Mollenauer | |
| 5,144,632 A | 9/1992 | Thonn | |
| 5,812,572 A | 9/1998 | King et al. | |
| 6,400,737 B1 * | 6/2002 | Broutin et al. | 372/20 |
| 6,512,617 B1 | 1/2003 | Tanji et al. | |
| 6,590,644 B1 | 7/2003 | Coin et al. | |
| 6,618,425 B1 | 9/2003 | Carlesi et al. | |
| 6,898,702 B1 | 5/2005 | Evans | |
| 6,978,624 B2 * | 12/2005 | Carlson et al. | 62/3.7 |
| 7,215,891 B1 * | 5/2007 | Chiang et al. | 398/137 |
| 2002/0027688 A1 | 3/2002 | Stephenson | |
| 2002/0078403 A1 | 6/2002 | Gullo et al. | |
| 2002/0097468 A1 | 7/2002 | Mecherle et al. | |
| 2002/0143920 A1 | 10/2002 | Dev et al. | |
| 2003/0223756 A1 | 12/2003 | Tatum et al. | |
| 2004/0022537 A1 | 2/2004 | Mecherle et al. | |
| 2004/0022543 A1 | 2/2004 | Hosking et al. | |
| 2004/0033079 A1 | 2/2004 | Sheth et al. | |
| 2004/0057730 A1 | 3/2004 | Littlejohn et al. | |
| 2004/0136719 A1 | 7/2004 | Hidai et al. | |
| 2005/0017751 A1 | 1/2005 | Gunn et al. | |
| 2005/0105915 A1 | 5/2005 | Light | |
| 2005/0111845 A1 | 5/2005 | Nelson et al. | |
| 2006/0034612 A1 | 2/2006 | Yu et al. | |
| 2006/0098699 A1 | 5/2006 | Sanchez | |

* cited by examiner

*Primary Examiner*—Agustin Bello
(74) *Attorney, Agent, or Firm*—Workman Nydegger

(57) ABSTRACT

An optical transceiver (or transmitter or receiver) that uses microcode that represents a formulaic relation between temperature and an appropriate value for an operational parameter given the temperature. The microcode is further structured such that when loaded into system memory and executed by the optical transceiver, the optical transceiver accesses the temperature as measured by a temperature sensor, calculates an appropriate value for the operational parameter given the accessed temperature using the formulaic relation, and adjusts the operational parameter according to the calculation. This allows the optical transceiver to adjust temperature-dependent operational parameters using less memory than required to perform a table-based representation of temperature versus the operational parameter.

27 Claims, 2 Drawing Sheets

MICROCODE-DRIVEN CALCULATION OF TEMPERATURE-DEPENDENT OPERATIONAL PARAMETERS IN AN OPTICAL TRANSMITTER/RECEIVER

BACKGROUND OF THE INVENTION

1. The Field of the Invention

The present invention relates generally to optical transmitters and receivers. More specifically, the present invention relates to optical transmitter and receivers that use microcode to calculate temperature-dependencies in operational parameters.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to the "controller") controls the operation of the laser driver and post-amplifier.

The operation of optical transceiver is susceptible to its operating environment. For example, temperature can change the operating characteristics of the optical transmitter itself. In particular, the wavelength output of a laser may drift from approximately 0.3 nanometers (nm) to approximately 0.6 nm for every one degree Celsius change in temperature. Since lasers generate heat during operation, this can have a significant effect upon the operation of the laser. Wavelength variations can cause crosstalk, where one transmission becomes confused with another. Furthermore, varying wavelengths due to varying laser temperature may cause different fiber attenuations. Accordingly, temperature has great influence over the proper operation of the optical transceiver.

Accordingly, it is important to compensate for the different operating temperatures. In order to do so, a temperature table is often kept correlating specific temperatures to specific values for an operating parameter. For example, temperature may be correlated to a laser bias current. By applying an appropriate laser bias current for a given temperature, the transmit power and wavelength can be kept less temperature dependent. Such temperature tables can be quite large, especially if the operating parameter is finely calibrated to temperature, or if the operating temperature range of the optical transceiver is large. However, the optical transceiver may have relatively limited memory resources. Accordingly, such temperature tables can occupy a significant amount of memory in the optical transceiver.

Therefore, what would therefore be advantageous are optical transceivers that are temperature compensated without requiring significant amounts of memory for temperature tables.

BRIEF SUMMARY OF THE INVENTION

The foregoing problems with the prior state of the art are overcome by the principles of the present invention, which relate to an optical transceiver that has at least one processor, a system memory, and persistent memory. The persistent memory includes microcode that represents a formulaic relation between temperature and an appropriate value for an operational parameter given the temperature. The operational parameter may be, for example, laser bias current, Thermo Electric Cooler (TEC) current, or any other temperature-dependent operational parameter. The microcode is further structured such that when loaded into system memory and executed by the processor(s), the optical transceiver accesses the temperature as measured by a temperature sensor, calculates an appropriate value for the operational parameter given the accessed temperature using the formulaic relation, and adjusts the operational parameter according to the calculation.

Accordingly, the relation between temperature and the operational parameter is represented in several lines of microcode using a formulaic relation. This represents far less memory than required to store a table-based correlation between temperature and the operational parameter. Accordingly, memory is preserved. In addition, as accessing a table can take significant time, the amount of time needed to execute the formulaic relation may even in some cases be comparable, or even faster, than a table-lookup. Therefore, the principles of the present invention provide for an efficient way to adjust for temperature-dependent operational parameters in an optical transceiver.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to an optical transceiver that has at least one processor, a system memory, and persistent memory. The persistent memory includes microcode that represents a formulaic relation between temperature and an appropriate value for an operational parameter given the temperature. The microcode is further structured such that when loaded into system memory and executed by the processor(s), the optical transceiver accesses the temperature as measured by a temperature sensor, calculates an appropriate value for the operational parameter given the accessed temperature using the formulaic relation, and adjusts the operational parameter according to the calculation. This allows the optical transceiver to adjust temperature-dependent operational parameters using less memory than required to perform a table-based representation of temperature versus the operational parameter.

Figure 1:
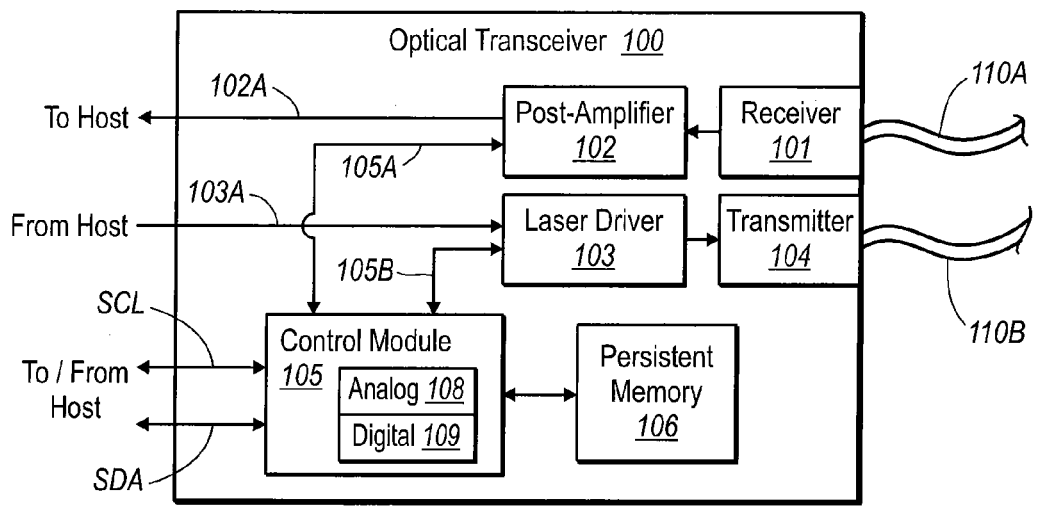
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention allow for suitable calibration of the optical transceiver 100 without requiring excessive human labor or time to monitor the calibration process. The principles of the present invention are suitable for 1 G, 2 G, 4 G, 10 G and higher bandwidth fiber optic links as sensitivity to operational circumstances increases. Furthermore, the principles of the present invention may be implemented in laser transmitter/receivers of any form factor such as XFP, SFP and SFF, without restriction.

The optical transceiver 100 receives an optical signal from fiber 110A using receiver 101. The receiver 101 acts as an optoelectric transducer by transforming the optical signal into an electrical signal. The receiver 101 provides the resulting electrical signal to a post-amplifier 102. The post-amplifier 102 amplifies the signal and provides the amplified signal to the host as represented by arrow 102A.

The optical transceiver 100 may also receive electrical signals from the host for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the laser transmitter/receiver 100 includes a control module 105, which evaluates temperature and voltage conditions and other operational circumstances, and receives information from the post-amplifier 102 (as represented by arrow 105A) and from the laser driver 103 (as represented by arrow 105B). This will allow the control module 105 to counteract the dynamically varying performance, and detect when there is a loss of signal. The control module 105, the post-amplifier 102, and the laser driver 103 may be other the same chip. Alternatively, they may be distributed across two or more chips regardless.

Specifically, the control module 105 may counteract the changes in performance by adjusting settings on the post-amplifier 102 and/or the laser driver 103 as represented by the arrows 105A and 105B. These settings adjustments are quite intermittent since they are only made when temperature or voltage or other low frequency changes so warrant.

The control module 105 has access to a persistent memory 106, which in one embodiment, is an Electrically Erasable and Programmable Read Only Memory (EEPROM). The persistent memory 106 and the control module 105 may be packaged together in the same package or in different packages without restriction. Data and clock signals may be provided from the host to the control module 105 using the serial clock line SCL, and the serial data line SDA. Also data may be provided from the control module 105 to the host using serial data signal SDA to allow for digital diagnostics and readings of temperature levels, transmit/receiver power levels, and the like.

Figure 2:
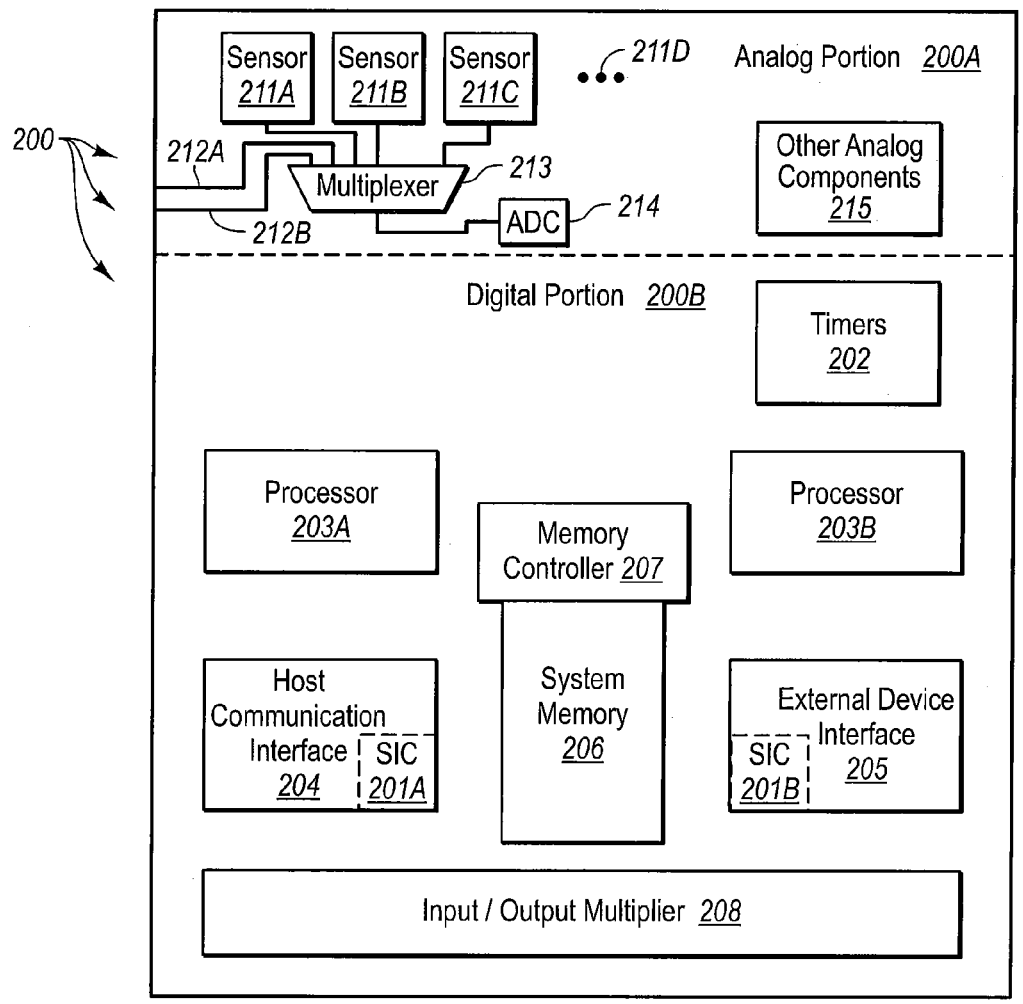
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion includes sensors 211A, 211B, 211C amongst potentially others as represented by the horizontal ellipses 211D. Each of these sensors may be responsible for measuring environmental and/or operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each value may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components. The high speed comparators may be supplied with one input being from an internal sensor or from an external line to receive a measured parameter value. The other input to the comparator may be a comparison value. Should the measured parameter value exceed the comparison value, the comparator may generate a logical high (or low) which indicates that the event has occurred. For example, suppose that the standard maximum transceiver temperature is 85 degrees Celsius. The actual measured transceiver temperature may be provided as one input to a comparator, while a value representing 85 degrees Celsius is provided to the other input of the comparator.

The digital portion 200B of the control module 200 may include a timer module 202 that provides various timing signals used by the digital portion 200B. Such timing signals may include, for example, programmable processor times. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host using the serial clock line SCL and the serial data line SDA of the optical transceiver 100. The external device interface 105 is used to communicate with, for example, other modules within the optical transceiver 100 such as, for example, the post-amplifier 102, the laser driver 103, or the persistent memory 106.

The internal system memory 206 (not to be confused with the external persistent memory 106) may be Random Access Memory (RAM). The memory controller 207 shares access to the system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as $I^2C$ or may be another other serial interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the chip. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment.

Figure 3:
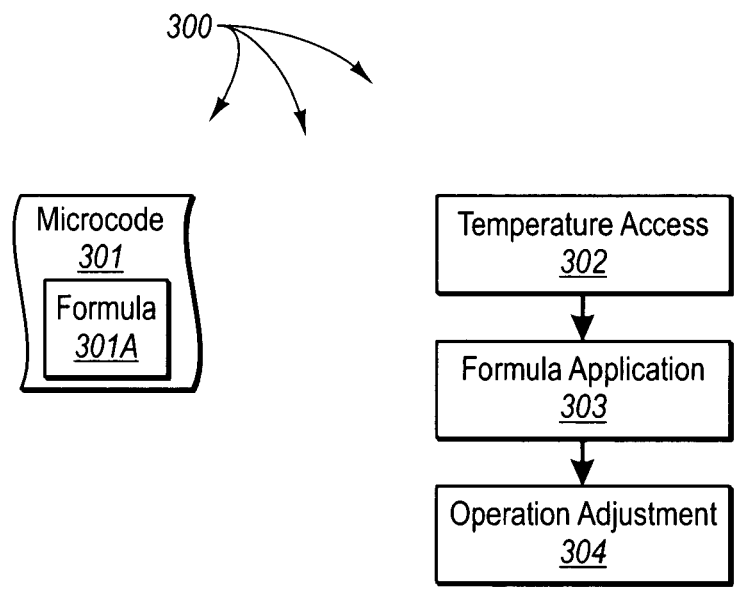
FIG. 3 illustrates a software architecture that may be maintained in system memory during run-time in accordance with the principles of the present invention.

FIG. 3 illustrates a software architecture 300 that may be instantiated in system memory 206. In particular, the processors 203 load microcode 301 into the system memory 206 from the persistent memory 106. The remainder of the software architecture 300 is either instantiated in system memory 206 upon the execution of the microcode 301, or else abstractly represents functionality implemented by the optical transceiver 100 upon the execution of the microcode 301. Alternatively, the microcode 301 may be directly executed from persistent memory. In that case, the microcode 301 is loaded into the system memory a fraction at a time (e.g., one instruction at a time) for execution by the processor. In this latter case, the system memory may be a register, flip-flops, or any other memory regardless of size or type.

Figure 4:
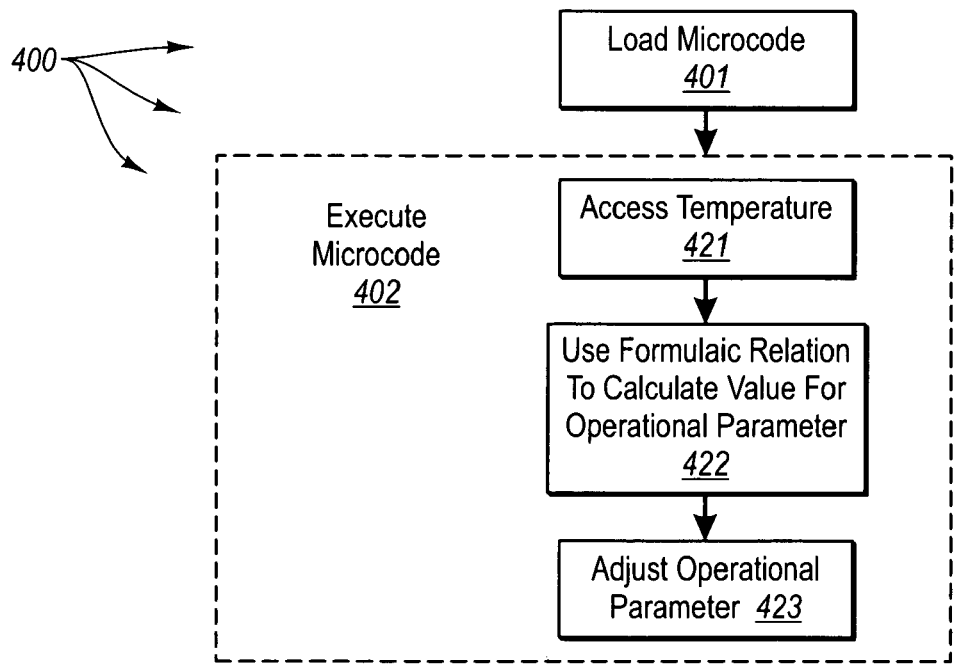
FIG. 4 illustrates a method for an optical transceiver to compensate for temperature-dependencies of an operation parameter in accordance with the principles of the present invention.

The software architecture 300 includes a temperature access component 302, a formula application component 303, and an operation adjustment component 304. The software architecture 300 of FIG. 3 will be described with reference to FIG. 4, which illustrates a flowchart of a method 400 for the optical transceiver to adjust an operational parameter to a temperature variation.

First, the optical transceiver 100 loads the microcode 301 from persistent memory 106 to system memory 206 (act 401). If the persistent memory 106 is an $I^2C$ EEPROM, then this may be accomplished using the conventional $I^2C$ two-wire interface. However, for other persistent memories, other communication protocols may be used. The microcode is structured to represent a formulaic relation 301A between temperature and an appropriate value for an operational parameter. For example, the formulaic relation may be a linear relation, or another higher-order polynomial relation. The formulaic relation may even be a non-polynomial expression. The operational parameter may be any operational parameter whose value should change with temperature in order to assure optimal operation of the optical transceiver. For example, the operational parameter may be laser bias current or Thermo Electric Cooler (TEC) current.

The processors 203 then execute the microcode (act 402). The microcode 301 is structured such that the optical transceiver performs the acts illustrated within act 402 when executed. Specifically, the optical transceiver accesses the temperature as measured by a temperature sensor (act 421). This may be accomplished, for example, using the temperature access component 302. Any one of the sensors 211 may be responsible for measuring temperature. The microcode may cause the processors to access the temperature from the temperature sensor directly, or may read the temperature from a register location that it periodically updated with values obtained from the temperature sensor. The measuring of the temperature may involve calculating the temperature based on an averaging of a current temperature with a previously sensed temperature.

The microcode 301 then causes the optical transceiver 100 to calculate an appropriate value for the operational parameter given the accessed temperature using the formulaic relation (act 422). This may be accomplished, for example, by the formula application component 303 applying the formulaic relation 301A represented by the microcode 301.

In one embodiment, the formulaic relation is obtained by taking several sample points in a temperature versus operation parameter value curve. Standard statistical curve fitting technology may then be used to fit a line or curve having particular characteristics (e.g., linear, polynomial, exponential, or the like) so as to reduce the sum of the squares of the error across all sample points. The curve-fitting techniques used to form the formulaic relation may be any known technique. Such curve-fitting techniques are known in the art and thus will not be described here.

In one embodiment, the formulaic relation is obtained during calibration of the optical transceiver 100. The formulaic relation may even have been obtained during a self-calibration process, which is described in commonly-assigned, co-pending U.S. patent application Ser. No. 10/882,447, filed on the same day herewith and entitled "Microcode-Driven Self-Calibration of Optical Transceiver to Environmental Conditions", which patent application is incorporated herein by reference in its entirety. Briefly stated, the self-calibration process involves placing the optical transceiver 100 in an environment in which an environmental parameter should change, measuring the environmental parameter under the range of expected environmental conditions, determining what the associated operational parameter should be given each of these environmental parameter values, and then recording the relation either in table form, or as a formulaic relation.

Returning to FIG. 4, after applying the formulaic relation (act 422), the microcode 301 causes the optical transceiver 100 to adjusts the operational parameter according to a result of the act of calculating (act 423). This may be accomplished using the operation adjustment component 304. In one embodiment, the control module 105 may write a value to a register location that is memory mapped to a particular operational component. For example, the laser bias current may be adjusted by writing the appropriate laser bias current value to a memory-mapped register location. The laser driver then uses that value to adjust its laser bias current. Alternatively and in addition, the value provided to a Digital to Analog Converter (DAC) that directly controls the laser bias current may be changed. Alternatively, the control module 105 may communicate the value to the laser driver.

A specific example in which the environmental parameter is temperature, and the operational parameter is laser bias current has been described. However, the principles of the present invention may apply to any measurable environmental parameter and operation parameter. For example, the environmental parameter may be, for example, supply voltage, humidity, acceleration, ambient light levels, ambient vibration, magnetic flux intensity, or any other environmental parameter that may affect the performance of an optical transceiver and that may be compensated for by suitable adjustment of an operational parameter. Furthermore, although a specific example of an operational parameter has been mentioned in the form of laser bias current, other operational parameters may be adjusted to compensate for the variations in environmental conditions. Such operational parameters may include, for example, a Thermo Electric Cooler (TEC) current.

An embodiment in which the microcode may be structured to apply a formulaic relation between one operational parameter and temperature has been described. However, the principles of the present invention may be applied to microcode that applies formulaic relations between multiple operational parameters (e.g., laser bias current and TEC current) to temperature, or that applies formulaic relations between a single operational parameter (e.g., laser bias current) and multiple environmental parameters (e.g., temperature and humidity), or that applies a formulaic relation between multiple operational parameters and multiple environmental parameters.

Accordingly, the principles of the present invention permit an optical transceiver to determine an appropriate value for one or more operational parameters without representing a table relation of the temperature to the operational parameter. Instead, a formulaic relation representing the correlation is represented. This reduces the amount of memory needed to maintain the table. The microcode, system memory, or persistent memory need not have any table information describing the temperature relationship at all. In another embodiment, a table may represent the relation for only a portion of the temperature range of the optical transceiver, while the formulaic relation is used for other temperature ranges. The formulaic relation might then be used only after the microcode forces a determination that the measured temperature falls outside of the temperature range for the table.

What is claimed and desired secured by United States Letters Patent is:

1. In an optical transceiver that includes at least one processor, a persistent memory and a system memory, a method comprising the following:
   an act of accessing a temperature as measured by a temperature sensor, the temperature being associated with the optical transceiver;
   an act of calculating appropriate values for a laser bias current and for an operational parameter of a receiver portion of the optical transceiver given the accessed temperature using first and second formulaic relations, wherein the first formulaic relation is a relation between temperature and an appropriate value for a laser bias current, and the second formulaic relation is a relation between temperature and an appropriate value for the operational parameter of a receiver portion of the optical transceiver; and
   an act of adjusting the laser bias current and the operational parameter according to a result of the act of calculating, wherein adjustment of the laser bias current and the operational parameter, as well as calculation of the appropriate values, is performed without the use of a temperature table,
   wherein the act of calculating the appropriate values using the first and second formulaic relations is performed without feedback.

2. A method in accordance with claim 1, further comprising performing the following after the act of accessing the temperature and before the act of calculating the appropriate values:
   an act of determining that the temperature falls outside of a predetermined temperature range.

3. A method in accordance with claim 2, wherein the temperature is a first temperature, the method further comprising the following:
   an act of accessing a second temperature as measured by the temperature sensor
   an act of determining that the second temperature falls inside of the predetermined temperature range; and
   an act of using the first and second formulaic relations to determine appropriate values for the laser bias current and the operational parameter.

4. A method in accordance with claim 1, wherein the operational parameter is a setting on a post-amplifier in the receiver portion of the optical transceiver.

5. A method in accordance with claim 1, wherein execution of the microcode further results in performance of the following:
   an act of calculating an appropriate value for a Thermo Electric Cooler (TEC) current given the accessed temperature using a third formulaic relation, the third formulaic relation comprising a relation between temperature and an appropriate value for the TEC; and
   an act of adjusting the TEC current according to a result of the act of calculating the appropriate value for the TEC current.

6. A method in accordance with claim 1, wherein the persistent memory is an Electrically Erasable and Programmable Read-Only Memory (EEPROM).

7. A method in accordance with claim 1, wherein at least one of the first and second formulaic relations is a linear approximation.

8. A method in accordance with claim 1, wherein at least one of the first and second formulaic relations is a polynomial approximation.

9. A method in accordance with claim 1, wherein at least one of the first and second formulaic relations is a non-polynomial approximation.

10. An optical transceiver comprising the following:
    a receiver portion configured to receive optical signals;
    a transmitter portion configured to transmit optical signals;
    at least one processor operably connected to the receiver and the transmitter portions;
    a system memory; and
    a persistent memory, wherein the persistent memory contains microcode that, when executed, causes the processor to perform the following:
       an act of accessing a temperature as measured by a temperature sensor, the temperature being associated with the optical transceiver;
       an act of calculating appropriate values for a laser bias current and for an operational parameter of a receiver portion of the optical transceiver given the accessed temperature using first and second formulaic relations, wherein the first formulaic relation is a relation between temperature and an appropriate value for a laser bias current, and the second formulaic relation is a relation between temperature and an appropriate value for the operational parameter of a receiver portion of the optical transceiver; and
       an act of adjusting the laser bias current and the operational parameter according to a result of the act of calculating,
       wherein adjustment of the laser bias current and the operational parameter, as well as calculation of the appropriate values, is performed without the use of a temperature table, and
       wherein the act of calculating the appropriate values using the first and second formulaic relations is performed without feedback.

11. An optical transceiver in accordance with claim 10, wherein execution of the microcode further results in performance of the following after the act of accessing the temperature and before the act of calculating the appropriate values:
    an act of determining that the temperature falls outside of a predetermined temperature range.

12. An optical transceiver in accordance with claim 11, wherein the temperature is a first temperature, and wherein execution of the microcode further results in performance of the following:
    an act of accessing a second temperature as measured by the temperature sensor;
    an act of determining that the second temperature falls inside of the predetermined temperature range; and
    an act of using the first and second formulaic relations to determine appropriate values for the laser bias current and the operational parameter.

13. An optical transceiver in accordance with claim 10, wherein the operational parameter is a setting on a post-amplifier in the receiver portion.

14. An optical transceiver in accordance with claim 10, wherein execution of the microcode further results in performance of the following:
    an act of calculating an appropriate value for a Thermo Electric Cooler (TEC) current given the accessed temperature using a third formulaic relation, the third formulaic relation comprising a relation between temperature and an appropriate value for the TEC; and
    an act of adjusting the TEC current according to a result of the act of calculating the appropriate value for the TEC current.

15. An optical transceiver in accordance with claim 10, wherein the persistent memory is an Electrically Erasable and Programmable Read-Only Memory (EEPROM).

16. An optical transceiver in accordance with claim 10, wherein at least one of the first and second formulaic relations is a linear approximation.

17. An optical transceiver in accordance with claim 10, wherein at least one of the first and second formulaic relations is a polynomial approximation.

18. An optical transceiver in accordance with claim 10, wherein at least one of the first and second formulaic relations is a non-polynomial approximation.

19. An optical transceiver in accordance with claim 10, wherein the optical transceiver is a 1 G laser transceiver.

20. An optical transceiver in accordance with claim 10, wherein the optical transceiver is a 2 G laser transceiver.

21. An optical transceiver in accordance with claim 10, wherein the optical transceiver is a 4 G laser transceiver.

22. An optical transceiver in accordance with claim 10, wherein the optical transceiver is a 10 G laser transceiver.

23. An optical transceiver in accordance with claim 10, wherein the optical transceiver is a laser transceiver suitable for fiber optic links greater than 10 G.

24. An optical transceiver in accordance with claim 10, wherein the optical transceiver is an XFP laser transceiver.

25. An optical transceiver in accordance with claim 10, wherein the optical transceiver is an SFP laser transceiver.

26. An optical transceiver in accordance with claim 10, wherein the optical transceiver is a SFF laser transceiver.

27. An optoelectronic device comprising the following:
    a receiver portion configured to receive optical signals;
    a processor;
    a system memory; and
    a persistent memory, wherein the persistent memory contains microcode that when executed by the processor, causes the processor to perform the following:
       an act of accessing the temperature as measured by a temperature sensor;

an act of calculating an appropriate value for an operational parameter of the receiver portion given the accessed temperature using a formulaic relation between temperature and an appropriate value for the operational parameter; and an act of adjusting the operational parameter according to a result of the act of calculating, wherein adjustment of the operational parameter, as well as calculation of the appropriate value, is performed without the use of a temperature table, and wherein the act of calculating the appropriate value using the formulaic relation is performed without feedback.

* * * * *